L. Savage.
Railroad Freight-Car.

Nº 75581. Patented Mar. 17, 1868

Witnesses.
H. C. Ashkettle
Theo Gusche

Inventor.
L. Savage.
per Munn &
Attorneys.

United States Patent Office.

L. SAVAGE, OF ASHTABULA, OHIO.

Letters Patent No. 75,581, dated March 17, 1868.

IMPROVEMENT IN RAILROAD FREIGHT-CARS.

The Schedule referred to in these Letters Patent and making part of the same.

TO ALL WHOM IT MAY CONCERN:

Be it known that I, L. SAVAGE, of Ashtabula, in the county of Ashtabula, and State of Ohio, have invented a new and useful Improvement in Railroad Freight-Cars; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to so improve the construction of freight-cars that the train need not be long detained in loading and unloading, that the necessity of side tracks and switches may be greatly lessened, and that the road can do a much greater amount of freighting business with the same amount of rolling-stock than it can do when the cars are constructed in the ordinary manner; and it consists principally in constructing the cars in two parts, as hereinafter more fully described.

Figure 1:
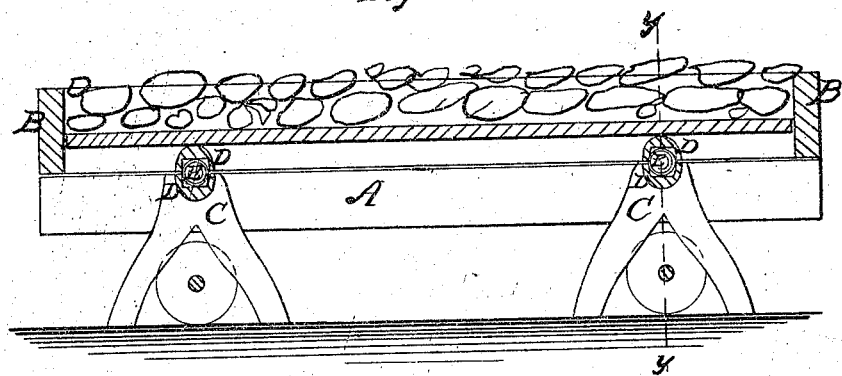
Figure 1 is a detail sectional view of a railroad-car illustrating my invention, taken through the line $x\ x$, fig. 2.
Figure 2:
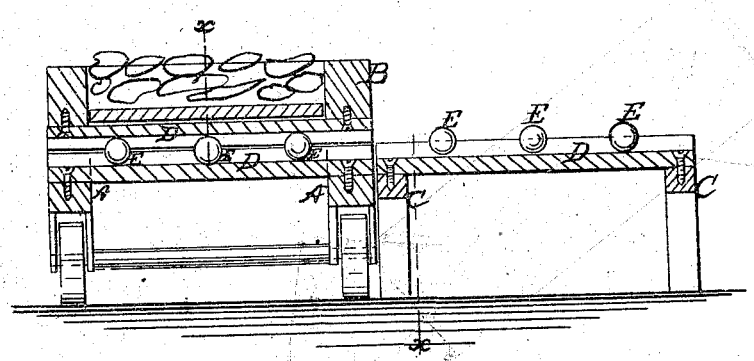
Figure 2 is a detail sectional view of the same, taken through the line $y\ y$, fig. 1.

A is the rolling part of the car. B represents the body or freight-receptacle of the car, which is made separate, and entirely distinct from the rolling part A, but in such a way as to fit upon said part A, as shown in figs. 1 and 2. When loading or unloading freight, the part B is removed from the part A upon trestles C, or upon a movable or stationary platform. The friction between the part B of the car, and the part A and trestles or platform C, may be diminished in various ways, as, for example, by attaching friction-wheels or rollers either to the part B, said rollers rolling upon the part A and trestles or platform C, or by attaching friction-wheels or rollers to the part A and trestles or platform C, upon which the part B rolls in being moved upon or from the said part A; or, if desired, metallic grooves or channels D may be let into and secured to the part A, part B, and trestles or platform C, and the friction be relieved by balls E, of any suitable material, placed in said grooves, as shown in the drawings. The trestles or platforms C may be made removable, or permanent fixtures, according as the amount of freighting or the number of cars to be loaded or unloaded at the same time may render advisable or necessary.

I claim as new, and desire to secure by Letters Patent—

1. The construction and arrangement of freight-cars in two parts, the upper part or freight-receptacle, B, being made separate and removable from the lower or running part, A, substantially as herein shown and described, and for the purpose set forth.

2. The combination of the metallic grooves or channels D and friction-wheels E, with either or both the parts A and B of the car, and with the trestles or platform C, for the purpose of diminishing the friction in moving the said part B, substantially as herein shown and described.

L. SAVAGE.

Witnesses:
   THEODORE HALL,
   HENRY H. HALL.